(12) United States Patent
Lin

(10) Patent No.: US 11,082,705 B1
(45) Date of Patent: Aug. 3, 2021

(54) METHOD FOR IMAGE TRANSMITTING, TRANSMITTING DEVICE AND RECEIVING DEVICE

(71) Applicant: AMBIT MICROSYSTEMS (SHANGHAI) LTD., Shanghai (CN)

(72) Inventor: Cheng-Long Lin, New Taipei (TW)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 0 days.

(21) Appl. No.: 16/903,653

(22) Filed: Jun. 17, 2020

(51) Int. Cl.
*H04N 19/167* (2014.01)
*H04N 19/37* (2014.01)
*H04N 19/176* (2014.01)

(52) U.S. Cl.
CPC ......... *H04N 19/167* (2014.11); *H04N 19/176* (2014.11); *H04N 19/37* (2014.11)

(58) Field of Classification Search
USPC ..................................................... 375/240.01
See application file for complete search history.

(56) References Cited

U.S. PATENT DOCUMENTS

2009/0086826 A1* 4/2009 May ................. H04N 19/61
375/240.27
2015/0181168 A1* 6/2015 Pahalawatta ....... G06K 9/00624
348/14.12
2015/0358625 A1* 12/2015 Lin ....................... H04N 19/107
375/240.24
2018/0278852 A1* 9/2018 Lin .................... G06K 9/00771

FOREIGN PATENT DOCUMENTS

| CN | 101453639 B | 5/2012 |
| CN | 105553618 B | 5/2019 |

* cited by examiner

*Primary Examiner* — Behrooz M Senfi
(74) *Attorney, Agent, or Firm* — ScienBiziP, P.C.

(57) ABSTRACT

In a method for image transmitting executed in a transmitting device, three data transmitting channels are established, the three data transmitting channels are a first channel, a second channel and a third channel. An image of a video is obtained, and the image is divided into a region of interest and a background region. A first data of the region of interest and a second data of the background region are obtained, and the first data is encoded through fountain coding to obtain a third data. The first data, the second data, and the third data are respectively transmitted through the first channel, the second channel, and the third channel to a receiving device. A network condition is received, and whether the network condition matches a preset condition is determined. When the network condition matches the preset condition, the first data is compensated according to a first preset algorithm.

12 Claims, 7 Drawing Sheets

METHOD FOR IMAGE TRANSMITTING, TRANSMITTING DEVICE AND RECEIVING DEVICE

FIELD

The subject matter herein generally relates to data transmitting technology.

BACKGROUND

With the advancement of audiovisual technology, the demand for high-definition video transmission has increased. However, due to the demand for high-quality video transmission, the amount of data to be transmitted is greatly increased, and connection quality problems, such as data loss, delay or jitter is easy to be caused under a limited network bandwidth.

When data is lost in a video, a portrait or region of interest (ROI) in the video is unclear, which affects user's senses. Loss of ROI data may make a camera unable to save image evidence, causing loss to the user. Thus, there is room for improvement within the art.

BRIEF DESCRIPTION OF THE DRAWINGS

Implementations of the present technology will now be described, by way of example only, with reference to the attached figures, wherein.

DETAILED DESCRIPTION

Figure 1:
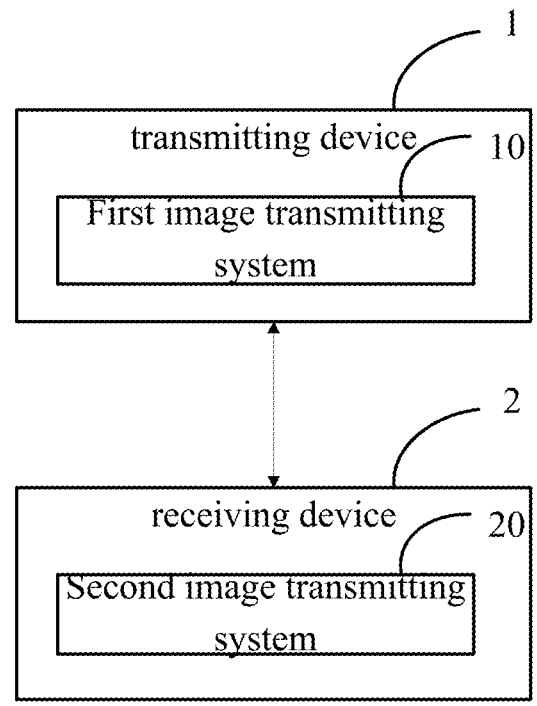
FIG. 1 is a diagram of one embodiment of an operating environment of a video image transmitting.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or another storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

Referring to FIG. 1, FIG. 1 is a diagram of an operating environment of a video image transmitting according to an embodiment of the present disclosure. A video image is transmitted from a transmitting device 1 to a receiving device 2. A first image transmitting system 10 is operated in the transmitting device 1. A second image transmitting system 20 is operated in the receiving device 2.

Figure 2:
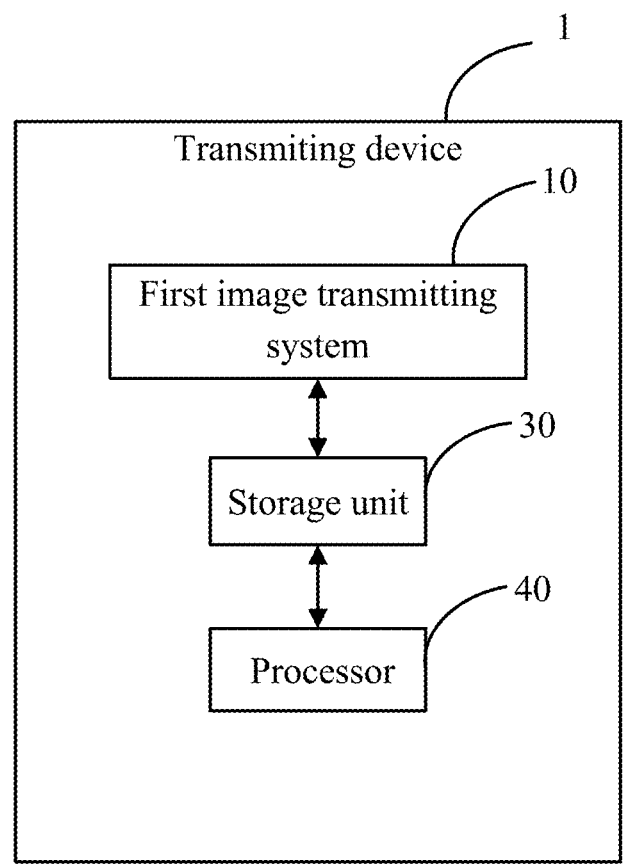
FIG. 2 is a block diagram of one embodiment of a transmitting device.

FIG. 2 is a diagram of an operating environment of a first image transmitting system 10 according to an embodiment of the present disclosure. The transmitting device 1 includes a storage unit 30 and a processor 40.

Figure 3:
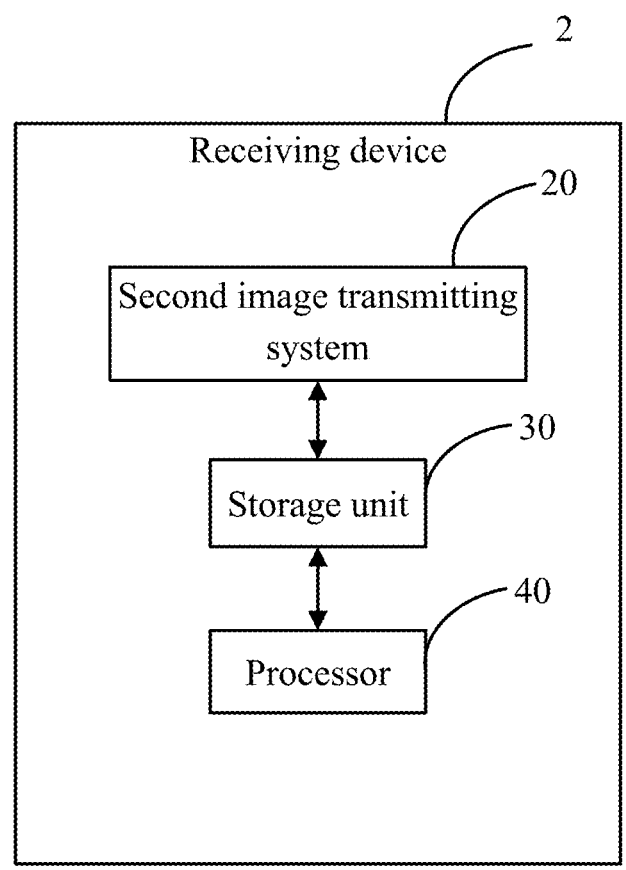
FIG. 3 is a block diagram of one embodiment of a receiving device.

FIG. 3 is a diagram of an operating environment of a second image transmitting system 20 according to an embodiment of the present disclosure. The receiving device 2 includes a storage unit 30 and a processor 40.

Wherein, the storage unit 30 includes at least one type of readable storage medium, the readable storage medium includes a flash memory, a hard disk, a multimedia card, a card-type memory (for example, SD or DX memory, etc.), a random access memory (RAM), a static random access memory (SRAM), a read only memory (ROM), an electrically erasable programmable read only memory (EEPROM), a programmable read only memory (PROM), a magnetic memory, a magnetic disk, an optical disk and so on. The processor 40 may be a central processing unit (CPU), a controller, a microcontroller, a microprocessor, or other data processing chips.

Figure 4:
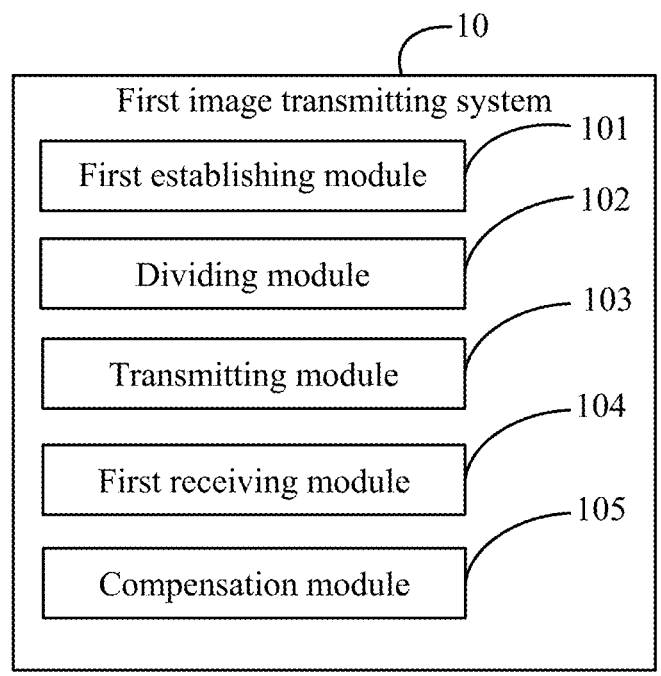
FIG. 4 is a block diagram of one embodiment of a first image transmitting system of the transmitting device.

FIG. 4 illustrates a block diagram of an exemplary embodiment of functional modules of a first image transmitting system 10.

The first image transmitting system 10 includes a first establishing module 101, a dividing module 102, a transmitting module 103, a first receiving module 104, and a compensation module 105. The modules are configured to be executed by one or more processors (in the embodiment, one processor 40) to complete the present invention. The module referred to in the present invention is a computer program segment that performs a specific instruction. The storage unit 30 is configured to store program code and other data of the first image transmitting system 10. The processor 40 is configured to execute the program code stored in the storage unit 30.

The first establishing module 101 establishes three data transmitting channels, the three data transmitting channels are a first channel, a second channel, and a third channel.

In the embodiment, the first channel, the second channel and the third channel established by the first establishing module 101 are three independent channels, transmitting data separately without affecting each other.

The dividing module 102 obtains an image of a video and divides the image into a region of interest (ROI) and a background region.

Figure 6:
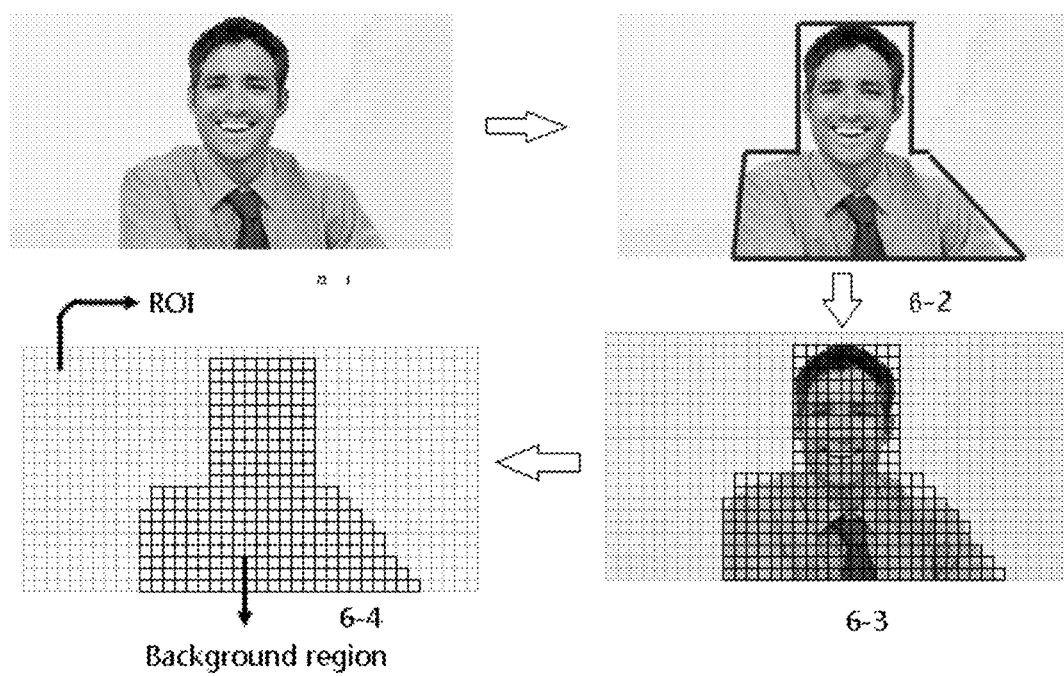
FIG. 6 is a schematic diagram of one embodiment of dividing an image into a region of interest and a background region.

Specifically, the transmitting device 1 divides the image into the ROI and the background region according to a content importance level, where a content of the image with high importance is the ROI, and the content of the image with low importance is the background region. For example, as shown in FIG. 6, as in 6-1 of FIG. 6, a person is in the ROI with high importance, and a region other than the person is the background region with low importance. In 6-2 of FIG. 6, the dividing module 102 first searches for a person in a video content according to a face recognition technology, and the region where the person located is the ROI. Further, in 6-3 of FIG. 6, the dividing module 102 performs macroblock coding on the ROI and the background region, and further divides the ROI and the background region into a plurality of macroblocks of a same size. In 6-4 of FIG. 6, the region represented by dark-colored macroblocks is the ROI, and the region represented by light-colored macroblocks is the background region.

The dividing module 102 further obtains a first data of the region of interest and a second data of the background region, and encoding the first data through fountain coding to obtain a third data.

In the embodiment, the third data obtained after fountain coding is used as compensation data, and when the first data is lost, the third data is used for compensation.

The transmitting module 103 transmits the first data, the second data, and the third data respectively through the first channel, the second channel, and the third channel to a receiving device.

Specifically, the transmitting module 103 encodes the first data of the ROI into m segments through H264, and transmits the first data through the first channel.

In the embodiment, the transmitting module 103 encodes multiple macroblocks in the ROI into m segments through H264, and transmits the m segments on the first channel in a form of network abstract layer units (NAL units).

Further, the transmitting module 103 encodes the second data of the background region into n segments through H264, and transmits the second data through the second channel.

In the embodiment, the transmitting module 103 encodes multiple macroblocks in the background region into n segments through H264, and transmits the n segments on the second channel in the form of network abstract layer units (NAL units).

Further, the transmitting module 103 encodes the m segments of the region of interest through fountain coding to obtain the third data, and transmits the third data through the third channel, wherein the third data is k segments of compensation data.

In one embodiment, a value of k is a preset ratio of the data size of the image, for example, 10%. For example, the data size (also called picture size) of the image is p bytes, then k can be calculated according to a formula as follows: $k[p*(m/(m+n))*10\%/Slice\_size]$, where the Slice_size is the number of bytes occupied by each segment.

The first receiving module 104 receives a network condition fed back by the receiving device and determining whether the network condition matches a preset condition.

The preset condition is preset by a developer. For example, in the embodiment, the receiving module 104 determines whether a packet loss rate of a feedback packet returned by the receiving device 2 is greater than 0. In one embodiment, the feedback packet uses a real-time control protocol (RTCP) for transmitting. Wherein, the RTCP feedback packet returned by the receiving device 2 at least includes: a bandwidth and the packet loss rate of the first channel and the bandwidth and the packet loss rate of the third channel.

The compensation module 105 compensates the first data according to a first preset algorithm when the network condition matches the preset condition.

In the embodiment, when the network condition matches the preset condition, for example, when the packet loss rate of the feedback packet returned by the receiving device 2 is greater than 0, the compensation module 105 compensates the first data according to the first preset algorithm. Specifically, the compensating the first data according to a first preset algorithm includes:

First, bit rate and resolution level of the video are reduced and encoding according to the reduced bit rate and resolution level of the video is performed.

Specifically, the compensation module 105 pre-establishes a level table containing a corresponding relationship between resolution and bit rate, sets an initial level, and plays the video image according to the resolution and bit rate corresponding to the initial level in the level table. When the packet loss rate of the returned feedback packet is greater than 0, the initial level in the level table is reduced by one level, and the video image is played according to the resolution and bit rate corresponding to the decreased level in the level table. In this way, the total amount of data in the transmitting process and the packet loss rate are reduced.

Further, the value of k is adjusted.

The value of k is adjusted according to the formula $k[p*(m/(m+n))*y\%/Slice\_size]$, m is the number of segments of the first data of the ROI after H264 encoding, n is the number of segments of the second data of the background region after H264 encoding, and k is the number of the compensation data obtained through fountain encoding the m segments of the ROI, P is the data size of the current image, and y % is the packet loss rate of the feedback packets returned by the receiving device 2. Wherein, the data amount of the first data in the ROI is calculated through formula $p (m/(m+n))$, and the data amount of the third data, that is, the data amount of the compensation data is calculated through formula $p*(m/(m+n))*y\%$, the number of compensation data k is calculated through formula $k=[p*(m/(m+n))*y\%/Slice\_size]$.

In the embodiment, by adjusting the k value, during the packet loss process, the data compensation amount of the ROI is increased to maintain the picture integrity of the ROI in the video.

In one embodiment, the value of k is a preset ratio of the data size of the image, for example, 10%. In this way, when y<10, the value of compensation data k remains unchanged. When y>10, the preset compensation data k can no longer meet the compensation data required for packet loss in the ROI, so according to the formula $k[p*(m/(m+n))*y\%/Slice\_size]$ to adjust the value of k.

Finally, the amount of the second data in the background region is reduced.

Specifically, the compensation module 105 reduces data amount of the second data of the background region according to the data amount of the third data, that is, the compensation module 105 reduces the data amount of the second data of the background region according to the data amount of the compensation data. In the embodiment, due to an increasing amount of the compensation data, in order to maintain overall transmitting amount unchanged, the amount of second data in the background region is reduced, and further the amount of data in the background region is reduced with the same number of bytes as the amount of compensation data, thereby ensuring the overall transmitting amount unchanged, without affecting the image of the ROI.

For example, m is equal to 10 segments in the ROI, n is equal to 26 segments in the background region, the data size of image is 50 kbytes, the packet loss rate represented by y % of the feedback packets returned by the receiving device 2 is 30%, Slice_size is 1.4 kbytes. Then the data amount of the first data in the ROI is calculated through formula p*(m/(m+n))=50*10/(10+26)) Kbytes=13.89 kbytes, the data amount of the third data, also called the data amount of the compensation data is calculated through formula p*(m/(m+n))*y %=50*10/(10+26))*30% Kbytes=4.167 Kbytes, then the value of compensation data is calculated through formula k=[p*(m/(m+n))*y %/Slice_size]=[50*10/(10+26))*30% Kbytes/1.4 Kbytes]=3. In this way, in the embodiment, for 50 kbytes data, when 15 kbytes are lost calculated at the packet loss rate of 30%, only 4.167 Kbytes of the background area is needed to be reduced to maintain the data integrity of the ROI, which is very efficient.

Figure 5:
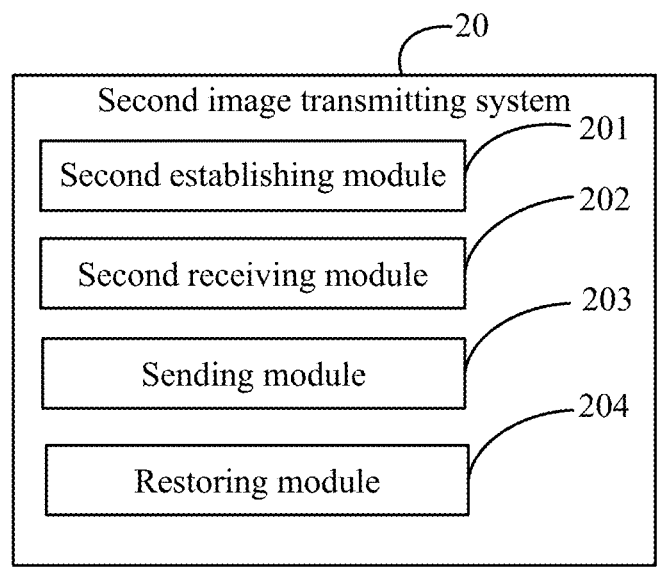
FIG. 5 is a block diagram of one embodiment of a second image transmitting system of the receiving device.

FIG. 5 is a block diagram of an exemplary embodiment of functional modules of a second image transmitting system 20.

The second image transmitting system 20 includes a second establishing module 201, a second receiving module 202, a sending module 203, and a restoring module 204. The modules are configured to be executed by one or more processors (in the embodiment, one processor 40) to complete the present invention. The module referred to in the present invention is a computer program segment that performs a specific instruction. The storage unit 30 is configured to store program code and other data of the second image transmitting system 20. The processor 40 is configured to execute the program code stored in the storage unit 30.

The second establishing module 201 establishes three data transmitting channels, the three data transmitting channels respectively are a first channel, a second channel, and a third channel.

The second receiving module 202 receives the first data, the second data, and the third data respectively through the first channel, the second channel, and the third channel to a receiving device.

Wherein an image of a video is divided into a region of interest (ROI) and a background region, the first data is data of the region of interest, the second data is data of the background region, and the third data is obtained by encoding the first data through fountain coding.

The sending module 203 analyzes a current network condition and replies to the current network condition back to the transmitting device 1.

The restoring module 204 restores the first data according to a second preset algorithm and plays the restored image.

The step of restoring the first data according to the second preset algorithm includes: the restoring module 204 further calculates a packet loss rate of the first data in the first channel and the packet loss rate of the third data in the third channel, decodes the first data of the first channel and the second data of the second channel, determines whether the first data of the ROI is lost, when the first data of the ROI is lost, the third data and the first data of the ROI are subjected to a fountain decoding operation to decode missing data of the ROI, when the first data is not lost, discards the third data, finally the restoring module 204 decodes the first data of the ROI and the second data of the background region through H264 to obtain a restored image.

In the embodiment, the image is divided into the ROI and the background region. The data of the ROI is important data. When a packet loss occurs, it is only necessary to compensate the data of the ROI through the compensation data, so that the image of the ROI can be completely restored, ensuring that important data can be completely restored. In addition, due to an additional generation of compensation data, in order to maintain the overall amount of data consistent, it is only necessary to reduce the amount of data in the background region, so that the overall amount of data transmitted is still consistent. In the embodiment, a small loss of data of unimportant region (background region) is exchanged for completeness of important image content in the ROI, and no additional bandwidth pressure is generated.

In this embodiment, the integrity of the content of the ROI of the image can be protected, and loss caused by the loss of content in the ROI can be avoided.

Figure 7:
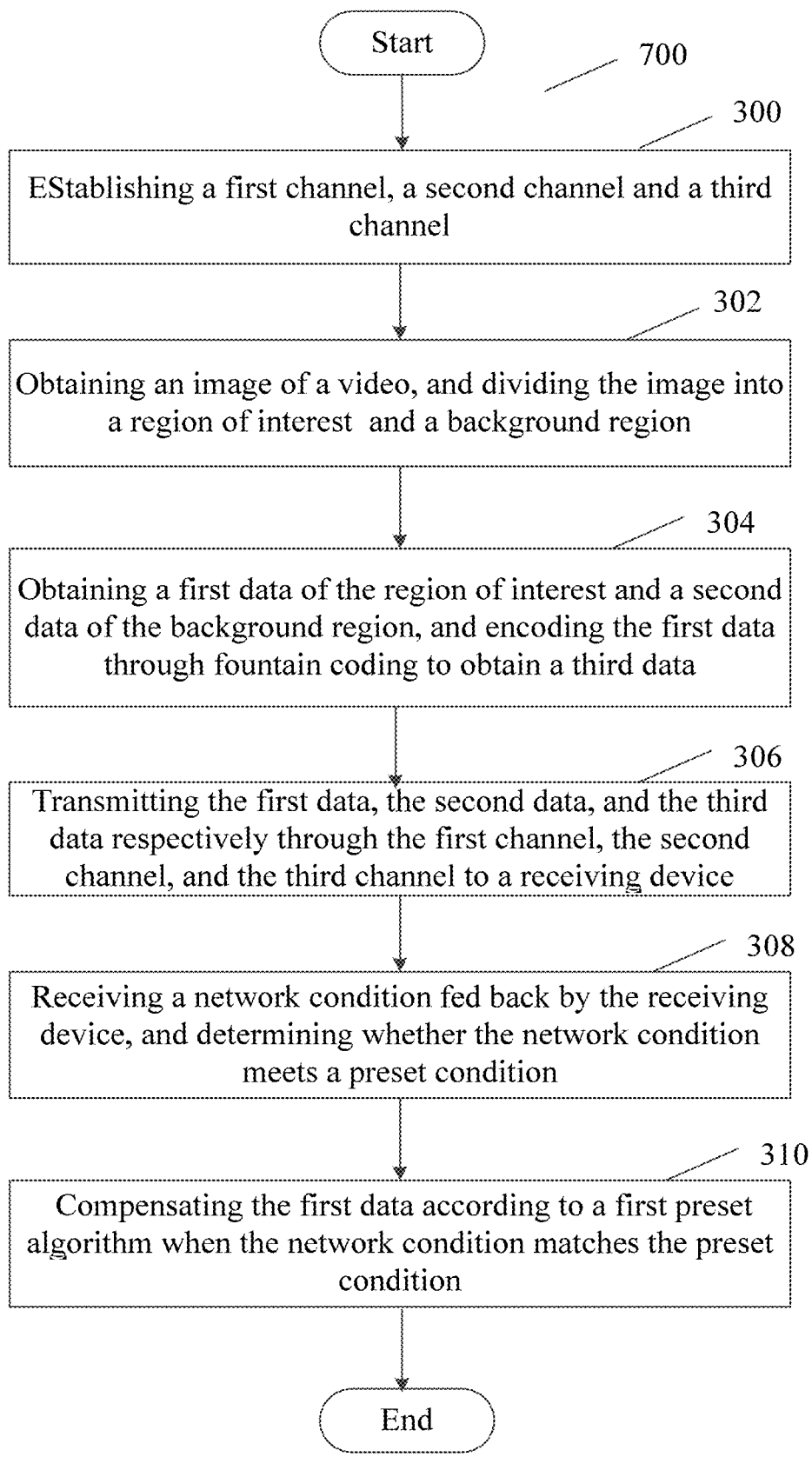
FIG. 7 is a flowchart of one embodiment of a method for image transmitting.

Referring to FIG. 7, a flowchart is presented in accordance with an embodiment of a method 700 for image transmitting, applied in a transmitting device 1, and the function modules 101-105 as FIG. 4 illustrates are executed by the processor 40. Each block shown in FIG. 7 represents one or more processes, methods, or subroutines, carried out in the exemplary method 700. Additionally, the illustrated order of blocks is by example only and the order of the blocks can be changed. The method 700 can begin at block 300.

At block 300, establishing three data transmitting channels, the three data transmitting channels are a first channel, a second channel, and a third channel.

In the embodiment, the first channel, the second channel and the third channel established by the transmitting device 1 are three independent channels, transmitting data separately without affecting each other.

At block 302, obtaining an image of a video, and dividing the image into a region of interest (ROI) and a background region.

Specifically, the transmitting device 1 divides the image into the ROI and the background region according to a content importance level, where a content of the image with high importance is the ROI, and the content of the image with low importance is the background region. For example, as shown in FIG. 6, as in 6-1 of FIG. 6, a person is in the ROI with high importance, and a region other than the person is the background region with low importance. In 6-2 of FIG. 6, the transmitting device 1 first searches for a person in a video content according to a face recognition technology, and the region where the person located is the ROI. Further, in 6-3 of FIG. 6, the transmitting device 1 performs macroblock coding on the ROI and the background region and further divides the ROI and the background region into a plurality of macroblocks of a same size. In 6-4 of FIG. 6, the region represented by dark-colored macroblocks is the ROI, and the region represented by light-colored macroblocks is the background region.

At block 304, obtaining a first data of the region of interest and a second data of the background region, and encoding the first data through fountain coding to obtain a third data.

In the embodiment, the third data obtained after fountain coding is used as compensation data, and when the first data is lost, the third data is used for compensation.

At block 306, transmitting the first data, the second data, and the third data respectively through the first channel, the second channel, and the third channel to a receiving device.

Specifically, the transmitting device 1 encodes the first data of the ROI into m segments through H264, and transmits the first data through the first channel.

In the embodiment, the transmitting device 1 encodes multiple macroblocks in the ROI into m segments through H264, and transmits the m segments on the first channel in a form of network abstract layer units (NAL units).

Further, the transmitting device 1 encodes the second data of the background region into n segments through H264, and transmits the second data through the second channel.

In the embodiment, the transmitting device 1 encodes multiple macroblocks in the background region into n segments through H264, and transmits the n segments on the second channel in the form of network abstract layer units (NAL units).

Further, the transmitting device 1 encodes the m segments of the region of interest through fountain coding to obtain the third data, and transmits the third data through the third channel, wherein the third data is k segments of compensation data.

In one embodiment, the value of k is a preset ratio of the data size of the image, for example, 10%. For example, the data size (also called picture size) of the image is p bytes, then k can be calculated according to a formula as follows: k[p*(m/(m+n))*10%/Slice_size], where the Slice_size is the number of bytes occupied by each segment.

At block 308, receiving a network condition fed back by the receiving device, and determining whether the network condition matches a preset condition.

The preset condition is preset by a developer. For example, in the embodiment, the transmitting device 1 determines whether a packet loss rate of a feedback packet returned by the receiving device 2 is greater than 0. In one embodiment, the feedback packet uses a real-time control protocol (RTCP) for transmitting. Wherein, the RTCP feedback packet returned by the receiving device 2 at least includes: a bandwidth and the packet loss rate of the first channel and the bandwidth and the packet loss rate of the third channel.

At block 310, compensating the first data according to a first preset algorithm when the network condition matches the preset condition.

In the embodiment, when the network condition matches the preset condition, for example, when the packet loss rate of the feedback packet returned by the receiving device 2 is greater than 0, the transmitting device 1 compensates the first data according to the first preset algorithm. Specifically, the compensating the first data according to a first preset algorithm includes:

First, bit rate and resolution level of the video are reduced and encoding according to the reduced bit rate and resolution level of the video is performed.

Specifically, the transmitting device 1 pre-establishes a level table containing a corresponding relationship between resolution and bit rate, sets an initial level, and plays the video image according to the resolution and bit rate corresponding to the initial level in the level table. When the packet loss rate of the returned feedback packet is greater than 0, the initial level in the level table is reduced by one level, and the video image is played according to the resolution and bit rate corresponding to the decreased level in the level table. In this way, the total amount of data in the transmitting process and the packet loss rate are reduced.

Further, the value of k is adjusted.

The value of k is adjusted according to the formula k[p*(m/(m+n))*y %/Slice_size], m is the number of segments of the first data of the ROI after H264 encoding, n is the number of segments of the second data of the background region after H264 encoding, and k is the number of the compensation data obtained through fountain encoding the m segments of the ROI, P is the data size of the current image, and y % is the packet loss rate of the feedback packets returned by the receiving device 2. Wherein, the data amount of the first data in the ROI is calculated through formula p (m/(m+n)), and the data amount of the third data, that is, the data amount of the compensation data is calculated through formula p*(m/(m+n))*y %, the number of compensation data k is calculated through formula k=[p*(m/(m+n))*y %/Slice_size].

In the embodiment, by adjusting the k value, during the packet loss process, the data compensation amount of the ROI is increased to maintain the picture integrity of the ROI in the video.

In one embodiment, the value of k is a preset ratio of the data size of the image, for example, 10%. In this way, when y<10, the value of compensation data k remains unchanged. When y>10, the preset compensation data k can no longer meet the compensation data required for packet loss in the ROI, so according to the formula k[p*(m/(m+n))*y %/Slice_size] to adjust the value of k.

Finally, the amount of the second data in the background region is reduced.

Specifically, the transmitting device 1 reduces the data amount of the second data of the background region according to the data amount of the third data, that is, the transmitting device 1 reduces the data amount of the second data of the background region according to the data amount of the compensation data. In the embodiment, due to an increasing amount of the compensation data, in order to maintain overall transmitting amount unchanged, the amount of second data in the background region is reduced, and further the amount of data in the background region is reduced with the same number of bytes as the amount of compensation data, thereby ensuring the overall transmitting amount unchanged, without affecting the image of the ROI.

For example, m is equal to 10 segments in the ROI, n is equal to 26 segments in the background region, the data size of image is 50 kbytes, the packet loss rate represented by y % of the feedback packets returned by the receiving device 2 is 30%, Slice_size is 1.4 kbytes. Then the data amount of the first data in the ROI is calculated through formula p*(m/(m+n))=50*10/(10+26)) Kbytes=13.89 kbytes, the data amount of the third data, also called the data amount of the compensation data is calculated through formula p*(m/(m+n))*y %=50*10/(10+26))*30% Kbytes=4.167 Kbytes, then the value of compensation data is calculated through formula k=[p*(m/(m+n))*y %/Slice_size]=[50*10/(10+26))*30% Kbytes/1.4 Kbytes]=3. In this way, in the embodiment, for 50 kbytes data, when 15 kbytes are lost calculated at the packet loss rate of 30%, only 4.167 Kbytes of the background area is needed to be reduced to maintain the data integrity of the ROI, which is very efficient.

Figure 8:
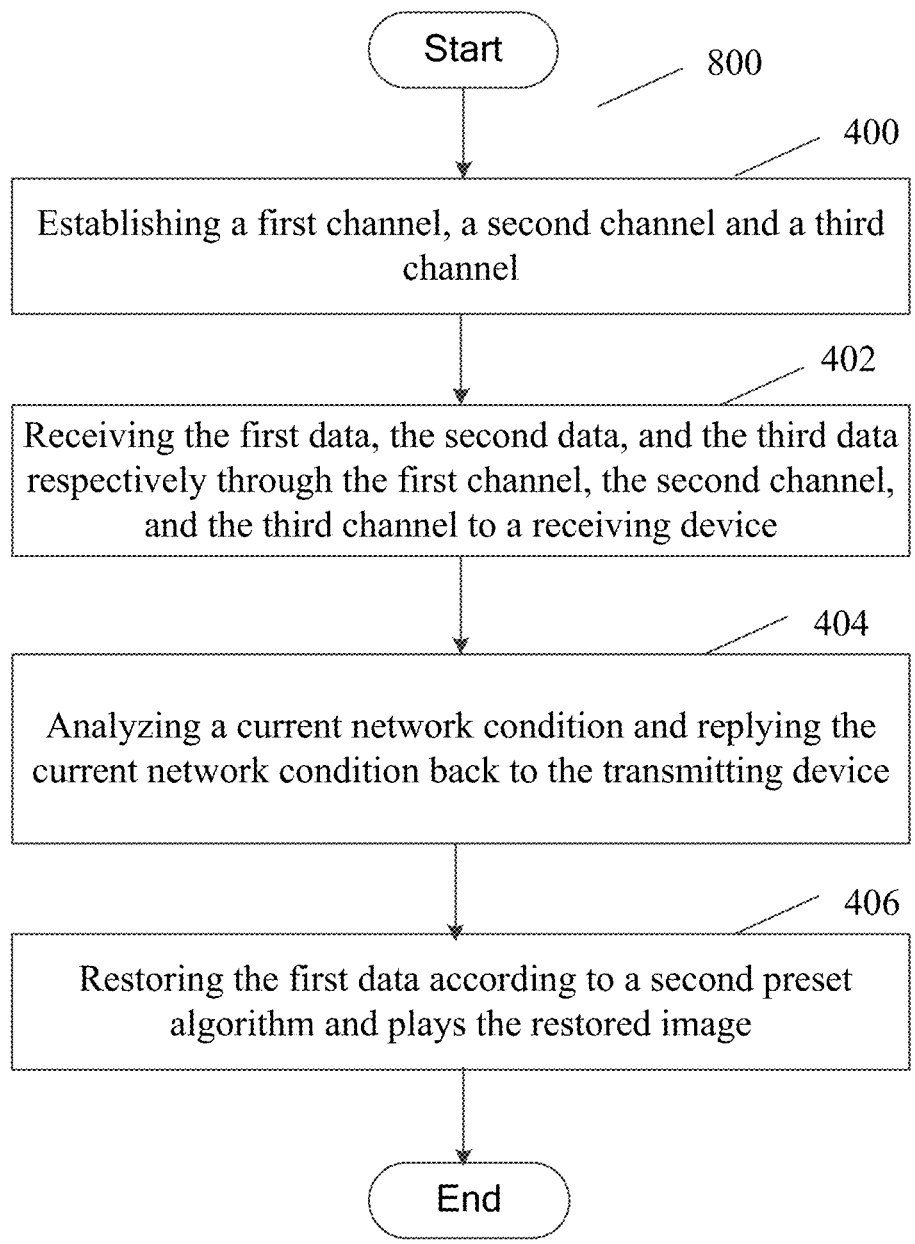
FIG. 8 is a flowchart of another embodiment of a method for image transmitting.

Referring to FIG. 8, a flowchart is presented in accordance with an embodiment of a method 800 for image transmitting, applied in a receiving device 2, and the function modules 201-204, as FIG. 5 illustrates, are executed by the processor 40. The method 800 is provided by way of example.

At block 400, establishing three data transmitting channels, the three data transmitting channels respectively are a first channel, a second channel, and a third channel.

At block 402, receiving the first data, the second data, and the third data respectively through the first channel, the second channel, and the third channel to a receiving device.

Wherein an image of a video is divided into a region of interest (ROI) and a background region, the first data is data of the region of interest, the second data is data of the background region, and the third data is obtained by encoding the first data through fountain coding.

At block 404, analyzing a current network condition and replying the current network condition back to the transmitting device 1.

At block 406, restoring the first data according to a second preset algorithm and plays the restored image.

The step of restoring the first data according to the second preset algorithm includes: the receiving device 2 further calculates a packet loss rate of the first data in the first channel and the packet loss rate of the third data in the third channel, decodes the first data of the first channel and the second data of the second channel, determines whether the first data of the ROI is lost, when the first data of the ROI is lost, the third data and the first data of the ROI are subjected to a fountain decoding operation to decode missing data of the ROI, when the first data is not lost, discards the third data, finally the receiving device 2 decodes the first data of the ROI and the second data of the background region through H264 to obtain a restored image.

In the embodiment, the image is divided into the ROI and the background region. The data of the ROI is important data. When a packet loss occurs, it is only necessary to compensate the data of the ROI through the compensation data, so that the image of the ROI can be completely restored, ensuring that important data can be completely restored. In addition, due to an additional generation of compensation data, in order to maintain the overall amount of data consistent, it is only necessary to reduce the amount of data in the background region, so that the overall amount of data transmitted is still consistent. In the embodiment, a small loss of data of unimportant region (background region) is exchanged for completeness of important image content in the ROI, and no additional bandwidth pressure is generated.

In this embodiment, the integrity of the content of the ROI of the image can be protected, and loss caused by the loss of content in the ROI can be avoided.

The embodiments shown and described above are only examples. Many details are often found in the art such as the other features of a method for image transmitting, a transmitting device, and a receiving device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A method for image transmitting, executed in a transmitting device, the method comprising:
   establishing a first channel, a second channel and a third channel;
   obtaining an image of a video, and dividing the image into a region of interest and a background region;
   obtaining a first data of the region of interest and a second data of the background region, and encoding the first data through fountain coding to obtain a third data;
   transmitting the first data, the second data, and the third data respectively through the first channel, the second channel, and the third channel to a receiving device;
   receiving a network condition feedbacked by the receiving device, and determining whether the network condition matches a preset condition; and
   when the network condition matches the preset condition, compensating the first data according to a first preset algorithm.

2. The method of claim 1, wherein the step of dividing the image into a region of interest and a background region comprises:
   dividing the image into the region of interest and the background region according to a content importance level, wherein a content of the image with high importance is the region of interest, and the content of the image with low importance is the background region.

3. The method of claim 1, wherein the step of transmitting the first data, the second data, and the third data respectively through the first channel, the second channel, and the third channel to a receiving device comprises:
   encoding the first data of the region of interest into m segments through H264, and transmitting the first data through the first channel;
   encoding the second data of the background region into n segments through H264, and transmitting the second data through the second channel; and
   encoding the m segments of the region of interest through fountain coding to obtain the third data, and transmitting the third data through the third channel, wherein the third data is k segments of compensation data.

4. The method of claim 3, the step of compensating the first data according to a first preset algorithm comprises:
   reducing bit rate and resolution level of the video, and encoding according to the reduced bit rate and resolution level of the video;
   adjusting value of k; and
   reducing amount of the second data in the background region.

5. A method for image transmitting, executed in a receiving device, the method comprising:
   establishing a first channel, a second channel and a third channel;
   receiving the first data, the second data, and the third data respectively through the first channel, the second channel, and the third channel to a receiving device, wherein an image of a video is divided into a region of interest and a background region, the first data is data of the region of interest, the second data is data of the background region, and the third data is obtained by encoding the first data through fountain coding;
   analyzing a current network condition and replying the current network condition back to the transmitting device; and
   restoring the first data according to a second preset algorithm and playing the restored image.

6. The method of claim 5, the step of restoring the first data according to a second preset algorithm comprises:
   calculating a packet loss rate of the first data in the first channel and the packet loss rate of the third data in the third channel;
   decoding the first data of the first channel and the second data of the second channel;
   determining whether the first data of the region of interest is lost;
   when the first data of the region of interest is lost, the third data and the first data of the region of interest are subjected to a fountain decoding operation to decode missing data of the region of interest, when the first data is not lost, discarding the third data; and decoding the first data of the region of interest and the second data of the background region through H264 to obtain a restored image.

7. A transmitting device, the transmitting device comprising:

at least one processor;

a storage unit; and one or more programs that are stored in the storage unit and executed by the at least one processor, the one or more programs comprising instructions for:

establishing a first channel, a second channel and a third channel;

obtaining an image of a video, and dividing the image into a region of interest and a background region;

obtaining a first data of the region of interest and a second data of the background region, and encoding the first data through fountain coding to obtain a third data;

transmitting the first data, the second data, and the third data respectively through the first channel, the second channel, and the third channel to a receiving device;

receiving a network condition feedbacked by the receiving device, and determining whether the network condition matches a preset condition; and when the network condition matches the preset condition, compensating the first data according to a first preset algorithm.

8. The transmitting device of claim 7, wherein the step of dividing the image into a region of interest and a background region comprises:

dividing the image into the region of interest and the background region according to a content importance level, wherein a content of the image with high importance is the region of interest, and the content of the image with low importance is the background region.

9. The transmitting device of claim 7, wherein the step of transmitting the first data, the second data, and the third data respectively through the first channel, the second channel, and the third channel to a receiving device comprises:

encoding the first data of the region of interest into m segments through H264, and transmitting the first data through the first channel;

encoding the second data of the background region into n segments through H264, and transmitting the second data through the second channel; and encoding the m segments of the region of interest through fountain coding to obtain the third data, and transmitting the third data through the third channel, wherein the third data is k segments of compensation data.

10. The transmitting device of claim 9, the step of compensating the first data according to a first preset algorithm comprises:

reducing bit rate and resolution level of the video, and encoding according to the reduced bit rate and resolution level of the video;

adjusting value of k; and reducing amount of the second data in the background region.

11. A receiving device, the receiving device comprising:

at least one processor;

a storage unit; and one or more programs that are stored in the storage unit and executed by the at least one processor, the one or more programs comprising instructions for:

establishing a first channel, a second channel and a third channel;

receiving the first data, the second data, and the third data respectively through the first channel, the second channel, and the third channel to a receiving device, wherein obtaining a image of a video is divided into a region of interest and a background region, the first data is data of the region of interest, the second data is data of the background region, and the third data is obtained by encoding the first data through fountain coding;

analyzing a current network condition and replying the current network condition back to the transmitting device; and restoring the first data according to a second preset algorithm and playing the restored image.

12. The receiving device of claim 11, the step of restoring the first data according to a second preset algorithm comprises:

calculating a packet loss rate of the first data in the first channel and the packet loss rate of the third data in the third channel;

decoding the first data of the first channel and the second data of the second channel;

determining whether the first data of the region of interest is lost;

when the first data of the region of interest is lost, the third data and the first data of the region of interest are subjected to a fountain decoding operation to decode missing data of the region of interest, when the first data is not lost, discarding the third data; and decoding the first data of the region of interest and the second data of the background region through H264 to obtain a restored image.

* * * * *